(12) United States Patent
Mueller et al.

(10) Patent No.: US 10,706,035 B2
(45) Date of Patent: Jul. 7, 2020

(54) AUTO UNLOAD

(71) Applicant: SAP SE, Walldorf (DE)

(72) Inventors: Klaus Otto Mueller, Karlsruhe (DE); Thomas Legler, Walldorf (DE)

(73) Assignee: SAP SE, Walldorf (DE)

( * ) Notice: Subject to any disclaimer, the term of this patent is extended or adjusted under 35 U.S.C. 154(b) by 275 days.

(21) Appl. No.: 15/945,715

(22) Filed: Apr. 4, 2018

(65) Prior Publication Data

US 2019/0311052 A1    Oct. 10, 2019

(51) Int. Cl.
*G06F 16/22* (2019.01)
*G06F 16/23* (2019.01)
*G06F 16/2458* (2019.01)
*G06F 9/445* (2018.01)

(52) U.S. Cl.
CPC ...... *G06F 16/2282* (2019.01); *G06F 9/44594* (2013.01); *G06F 16/2358* (2019.01); *G06F 16/2477* (2019.01)

(58) Field of Classification Search
CPC ............. G06F 16/2282; G06F 16/2477; G06F 16/2358
USPC ........................................................ 707/803
See application file for complete search history.

(56) References Cited

U.S. PATENT DOCUMENTS

| | | | | |
|---|---|---|---|---|
| 9,160,650 | B2* | 10/2015 | Zhang | H04L 45/121 |
| 2011/0113036 | A1* | 5/2011 | Idicula | G06F 16/835 |
| | | | | 707/747 |
| 2015/0067266 | A1* | 3/2015 | Jafri | G06F 12/0804 |
| | | | | 711/136 |
| 2017/0039232 | A1* | 2/2017 | Jayanth | G06F 16/278 |

* cited by examiner

*Primary Examiner* — Kimberly L Wilson
(74) *Attorney, Agent, or Firm* — Mintz, Levin, Cohn, Ferris, Glovsky and Popeo, P.C; Pedro Suarez; Paul Brockland

(57) ABSTRACT

A system for unloading tables of a database is provided. In some aspects, the system performs operations including determining that a number of accesses to a table occurring within a time period has satisfied an access threshold. The operations may further include identifying, in response to the determining, a first timestamp indicating a most recent access to the table. The operations may further include determining whether a difference between a current timestamp and the first timestamp satisfies a first time threshold. The operations may further include comparing, in response to the difference satisfying the first time threshold, a ratio of the difference and a size of the table to a ratio threshold. The operations may further include unloading, in response to satisfying the ratio threshold, the table. The operations may further include adjusting, based on the feedback, the first time threshold and/or the ratio threshold.

20 Claims, 6 Drawing Sheets

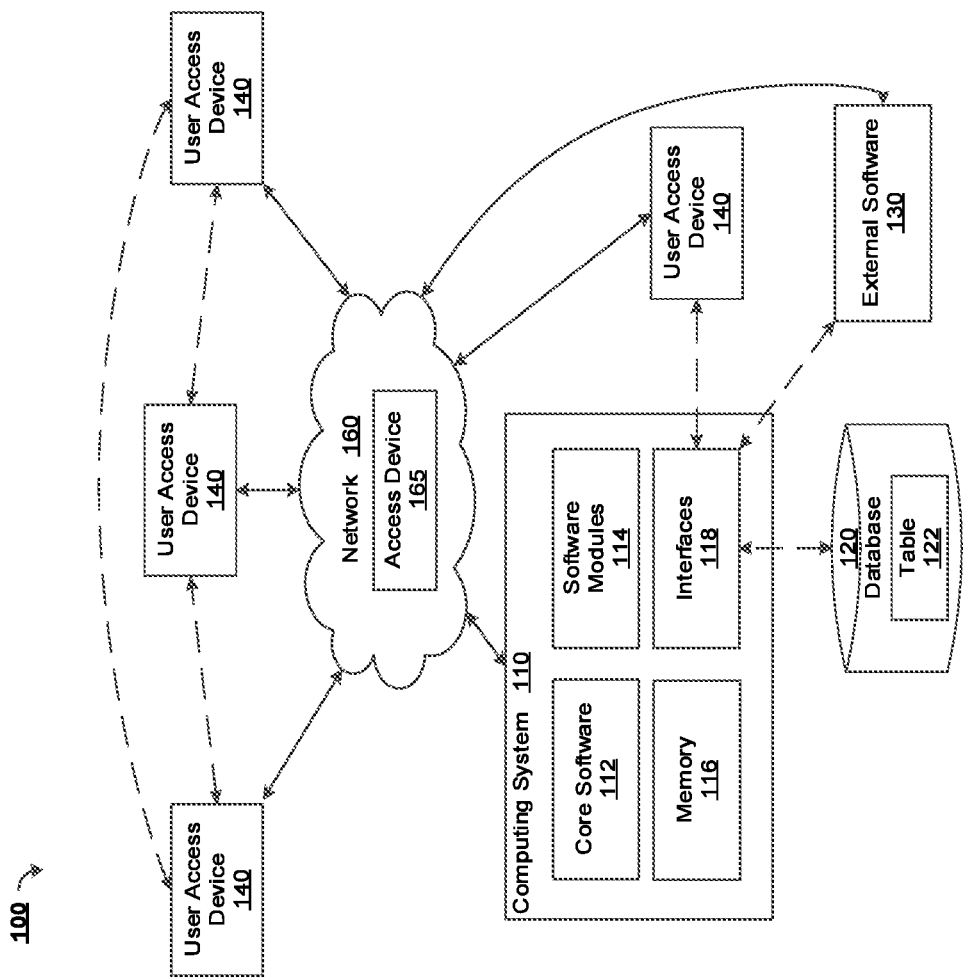

TPL = 0 and TUP > 0 and if(TURP > 0, TLD > TURP, TLD > 1200 and TLD > MMS)

TPL = 0      table is not part of the tables preload

TUP > 0      table's unload priority is at least not 0 ("DontUnloadAtALL")

if(TURP > 0,  table's unused retention period is set

TLD > TURP,   table's lock delay larger than unused retention period (in seconds)

TLD > 1200    table's lock delay larger than 20 minutes and TLD > MMS)   and larger than table size in MB

FIG. 2

AUTO UNLOAD

TECHNICAL FIELD

The subject matter described herein relates generally to database processing and, more specifically, to unloading tables in database systems.

BACKGROUND

A database may be configured to store a plurality of electronic data records. The database may be coupled with a database management system (DBMS) that supports a variety of database operations for accessing the data records held in the database including, for example, structured query language (SQL) queries and/or the like. The database may be stored in a cloud server.

SUMMARY

Systems, methods, and articles of manufacture, including computer program products, are provided for data management. In one aspect, there is provided a system. The system may include at least one data processor and at least one memory. The at least one memory may store instructions that result in operations when executed by the at least one data processor. The operations may include determining that a number of accesses to a table occurring within a time period has satisfied an access threshold. The operations may further include identifying, in response to the determining, a first timestamp indicating a most recent access to the table. The operations may further include determining whether a difference between a current timestamp and the first timestamp satisfies a first time threshold. The operations may further include comparing, in response to the difference satisfying the first time threshold, a ratio of the difference and a size of the table to a ratio threshold. The operations may further include unloading, in response to satisfying the ratio threshold, the table. The operations may further include adjusting, based on the feedback, the first time threshold and/or the ratio threshold.

In another aspect, there is provided a method. The method includes determining that a number of accesses to a table occurring within a time period has satisfied an access threshold. The method may further include identifying, in response to the determining, a first timestamp indicating a most recent access to the table. The method may further include determining whether a difference between a current timestamp and the first timestamp satisfies a first time threshold. The method may further include comparing, in response to the difference satisfying the first time threshold, a ratio of the difference and a size of the table to a ratio threshold. The method may further include unloading, in response to satisfying the ratio threshold, the table. The method may further include adjusting, based on the feedback, the first time threshold and/or the ratio threshold.

In another aspect, there is provided a non-transitory computer program product storing instructions which, when executed by at least one data processor, causes operations which include determining that a number of accesses to a table occurring within a time period has satisfied an access threshold. The operations may further include identifying, in response to the determining, a first timestamp indicating a most recent access to the table. The operations may further include determining whether a difference between a current timestamp and the first timestamp satisfies a first time threshold. The operations may further include comparing, in response to the difference satisfying the first time threshold, a ratio of the difference and a size of the table to a ratio threshold. The operations may further include unloading, in response to satisfying the ratio threshold, the table. The operations may further include adjusting, based on the feedback, the first time threshold and/or the ratio threshold.

In some variations, one or more features disclosed herein including the following features may optionally be included in any feasible combination. For example, identifying the first timestamp may be based on a table lock. Retrieving the feedback may include calculating a second difference between a second timestamp associated with the unloading and a third timestamp associated with the reloading. Retrieving the feedback may further include comparing the second difference to a second time threshold. Retrieving the feedback may further include determining, based on the comparing, whether the unloading was correct. The feedback may include the determination of whether the unloading was correct. The determination of whether the unloading was correct may include determining, in response to the second difference being greater than the second time threshold, that the unloading was correct. The determination of whether the unloading was correct may include determining, in response to the second difference being less than the second time threshold, that the unloading was incorrect. The unloading may be based on a table unload priority and a table preload setting. The table unload priority may indicate a priority for unloading the table, and the table preload setting may indicate whether the table is a preloaded table. The operations may further include determining a type of table access for each of the number of accesses to the table. The type of table access may include a first type of access associated with a first table unload priority and a second type of access associated with a second table unload priority. The first table unload priority may be higher than the second table unload priority. The operations may further include calculating, in response to the unloading, an expected time when the table will be accessed. The operations may further include reloading, prior to the expected time, the table. The reloading may be based on the size of the table.

Implementations of the current subject matter may include, but are not limited to, methods consistent with the descriptions provided herein as well as articles that include a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which may include a non-transitory computer-readable or machine-readable storage medium, may include, encode, store, or the like one or more programs that cause one or more processors to perform one or more of the operations described herein. Computer implemented methods consistent with one or more implementations of the current subject matter may be implemented by one or more data processors residing in a single computing system or multiple computing systems. Such multiple computing systems may be connected and may exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1 depicts a functional block diagram of a system in which features consistent with the described subject matter may be implemented;

FIG. 2 depicts an example of a cost function algorithm, in accordance with some example implementations;

When practical, similar reference numbers denote similar structures, features, or elements.

DETAILED DESCRIPTION

Figure 3:
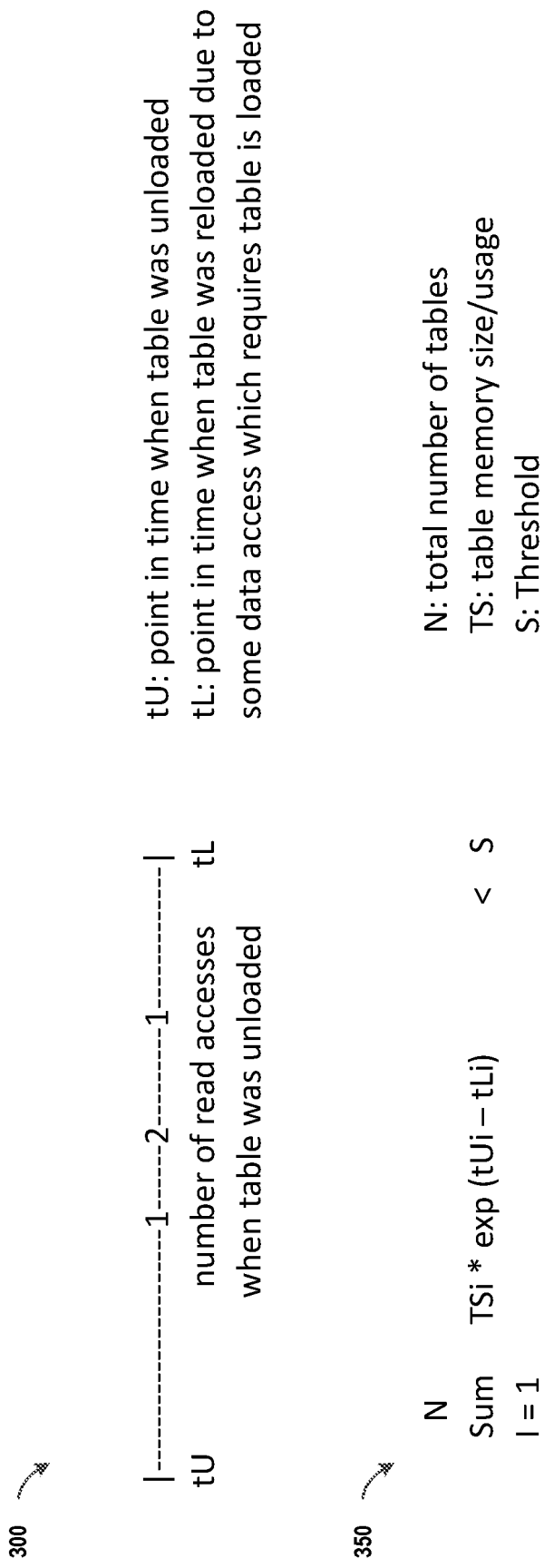
FIG. 3 depicts a timeline diagram of read accesses of a table during a time period, in accordance with some implementations.

In a cloud environment, there are many smaller or medium sized systems on same hardware. These systems may have applications that tend to have a large in number of tables stored on a database. Each table of these systems may include some processing overhead. For example, each table may include metadata and other data that is maintained in the cloud. At least a portion of the tables may be rarely accessed or used. After loading the tables, such tables may remain unnecessarily in memory. For example, some tables may be only used at system start-up or even only used at the beginning of a whole system lifetime. Additionally, some tables may be unused for long periods of time or may be unused periodically. The large amount of tables may block resources both for a memory and also for a processor, such as a central processing unit (CPU).

In an in-memory database system (IMDB), tables or partitions may be unloaded, when there is a threat of a memory bottleneck. The actual unloading of these tables may not take place in time to alleviate a high system memory demand and may still result in slow processing after the unload. Even if the unloading occurs on time, the amount of data unloaded may not be sufficient because a request is larger than the vacated space. Additionally, the type of data may not considered when unloading which can result in unloading incorrect or unintended tables. For example, the system may not consider whether the unloaded data is related to administrative/general housekeeping table access, which should be unloaded, or is related to a table access associated with business transactions, which should not be unloaded. The system may also unload only a portion of the table data while other portions, such as meta information, may remain loaded. As such, the amount of data unloaded may not be sufficient to improve performance and/or memory usage.

Implementations described herein relate to unloading table data and/or partitions to reduce the memory storage and processing needs of a cloud system. Decisions on whether to unload data may be based on certain table parameters to account for unloading unintended tables or an insufficient number of tables. Future decisions on whether to unload a table may be improved based on feedback from past unload decisions. The feedback may indicate whether a past decision to unload or not unload a given table was correct. As the system receives more feedback regarding its past decisions, it may update its decision process or algorithm based on the feedback. Unloading unused tables in a manner described herein may enable the cloud system to startup faster with less memory consumed and to access data in loaded table partitions more quickly and efficiently.

FIG. 1 illustrates a functional block diagram of a system 100 in which features consistent with the described subject matter may be implemented. As illustrated, the system 100 may include a computing system 110 capable of communicating with one or more user access devices 140. The computing system 110 may utilize one or more interfaces 118 for communication. Communication among the devices of the system 100 may be through the use of direct communications, such as through the use of a wireless connection like Bluetooth, near-field communication (NFC), ZigBee, and/or the like, and/or a wired connection such as universal serial bus (USB) and/or the like. Communication may additionally or alternatively occur through indirect communications, such as over a network 160 (e.g., a local area network, a wide area network, a wireless network, the Internet, or the like).

Communication over the network 160 may utilize a network access device 165, such as a base station, a Node B, an evolved Node B (eNB), an access nodes (ANs), a hotspot, and/or the like. Any of the user access device 140 may include personal computers, desktop computers, laptops, workstations, cell phones, digital media devices, smart phones, smart watches, PDAs (personal digital assistants), tablets, hardware/software servers, sensors, sensor devices, terminals, access terminals (ATs), mobile stations, user equipment (UE), subscriber units, and/or the like.

As illustrated, the computing system 110 may include core software 112 and/or one or more software modules 114. The core software 112 may provide one or more features of a high-level programming software system. The software modules 114 may provide more specialized functionality. For example, the core software 112 and/or software modules 114 may include database management features, such as those described herein.

The core software 112 or other similar software/hardware may be capable of accessing a database layer, such as the database 120, which includes at least one table 122. The database table 122 may store any kind of data, including transactional data, metadata, timestamp data, lock data, access data, master data, company/business data, and/or the like. The computing system 110 may comprise a cloud server storing table partitions.

One or more of the software modules 114 may be configured to utilize data stored in the memory 116, data stored in the database 120, and/or data otherwise accessible to the computing system 110. As further illustrated, the computing system 110 may be capable of utilizing external software 130. The external software 130 may provide additional functionalities or services, which may not be available at the computing system 110. The external software 130 may include cloud services. The computing system 110 may aggregate or otherwise provide a gateway via which users may access functionality provided the external software 130. The database 120 and/or the external software 130 may be located across one or more servers, and/or communication among the computing system 110, the database, and/or the external software 130 may occur over the network 160.

At least a portion of the illustrated system 100 may include hardware and/or software that interacts with a database, users, and/or other software applications for defining, creating, and/or updating data, for receiving, handling, optimizing, and/or executing database queries, and/or for running software/applications (e.g., software modules 114, and/or external software 130) which utilize a database. The database 120 may be a structured, organized collection of data, such as schemas, tables, queries, reports, views, and/or the like, which may be processed for information. The database 120 may be physically stored in a hardware server or across a plurality of hardware servers. The database 120 may include a row store database, a column store database, a schema-less database, or any other type of database. The computing system 110 may be configured to perform OLTP (online transaction processing) and/or OLAP (online analytical processing), which may include complex analytics and tasks. Any of the data stored in the database 120 may additionally or alternatively be stored in the memory 116, which may be required in order to process the data. As noted, a large accumulation of table data stored in the database 120 may affect the performance and/or resources of the memory 116, the core software 112, and/or a processor of the computing system 110.

The core software 112 may be configured to load the information from the database 120 to memory 116 (e.g., main memory) in response to some event and/or determination. For example, data may be retrieved from the database 120 and/or loaded into the memory 116 based on receipt of a query instantiated by a user or computer system, which may occur through one or more user access device 140, external software 130, and/or the like. At least a portion of the data for the database 120 may reside in-memory (e.g., in random-access memory (RAM)), within the memory 116, for example. Data stored in-memory may be accessed faster than data stored in long term storage (also referred to herein as "on disk").

Although the database 120 may be illustrated as described as being separate from the computing system 110, in various implementations, at least a portion of the database 120 may be located within the memory 116 of the computing system 110.

The computing system 110 may implement procedures for identifying and unloading unused table partitions to improve memory consumption and processing speeds. After unloading the identified table partitions, the computing system 110 may receive feedback regarding whether the unloading was correct and/or resulted in improved performance.

In order to avoid a memory shortage due to the number of tables in the database, the computing system 110, or a component of the computing system 110, may perform periodic checks to determine whether the database may be optimized by unloading tables. For example, the computing system 110 may implement a log or protocol to determine how often tables of the database are accessed and determine how they are used. The determining which data to unload may be based on one or more parameters to indicate that a loaded table partition has not been accessed for a threshold time period and/or is not likely to be accessed within a threshold time period. The parameters may include the type of data, the size of data, a rate or quantity of out of memory (OOM) errors, a last time when the data was accessed, a type of access to the data, and/or the like.

The computing system 110 may check a last access timestamp to determine the last time the data was accessed. The computing system 110 may also distinguish between different types of access. For example, the computing system 110 may distinguish between data queries with real business content and general data housekeeping queries such as, check routines, garbage collections, merge processes, such as mergedog, and/or the like. General data housekeeping queries may include "external" housekeeping, such as database management software, which can periodically query information from the database to track database status. It may be advantageous for the computing system 110 to ignore the general housekeeping queries in the determination of which table partitions to unload. The computing system 110 may ignore such periodic housekeeping operations by allowing a small increase of a reading counter. The increase in the reading counter may specify a threshold number table accesses per unit of time that may not considered to be relevant. This value may be parameterized to factor in the housekeeping queries. The general housekeeping processes may only access loaded tables and not unloaded tables which may result in less overall processing when tables are unloaded. Moreover, general housekeeping processes may not trigger loading unloaded tables, so costly reloads due to housekeeping processes may be avoided.

The computing system 110 may distinguish between different types of access by differentiating and counting a number of index lock requests according to a user or a system session. The locks caused by internal sessions may not be counted, meaning that they are treated as general housekeeping. In some aspects, the computing system 110 may implement a counter per table in order to count the number of index locks per session.

The computing system 110 may distinguish the access to tables according to a category, such as a system or user category. Internal system tables may not be unloaded but user tables may be unloaded. In other aspects, the computing system 110 may distinguish the access to tables according to a distribution of index lock statistics over a time period. For example, a check protocol, such as a mergedog loop which last about one minute, sets one or more bits per table to indicate whether that table was used during the time period. In some aspects, if two bits are used to indicate a table usage, bits 00 may indicate the table was not locked at all during the time period, bits 01 may indicate that the table was locked once, bits 10 may indicate that the table was locked below a threshold number times (e.g., locked 2-5 times), and bits 11 may indicate that the table was locked more often than the threshold for bits 10 (e.g., more than 2-5 times). If a table was locked, the computing system 110 may determine that a table index handle was acquired and the table was used.

As noted above, distinguishing between the types of access may enable the computing system 110 to determine whether a table has had meaningful access within a certain time period. Once the computing system 110 determines that a table or table partition has not been accessed for a threshold time period, it may not mean that the table will be unloaded as soon the threshold is satisfied. In some aspects, after the threshold is satisfied, the computing system 110 may check the table for unloading and make an unload decision. The computing system 110 may execute a cost function algorithm to determine whether the table should be unloaded.

FIG. 2 depicts an example of a cost function algorithm 200, in accordance with some example implementations. In some aspects, the cost function may be executed by the core software 112, the software modules 114, and/or the external software 130. The cost function 200 may be modified by a database administrator. The cost function 200 may also be tailored to be table-specific, meaning different rules can be applied to different tables. As shown in FIG. 2, TPL is a table preload setting, TUP is a table unload priority which defines the individual table unload priority compared to other tables, TURP is a table unused retention period in seconds, TLD is a table lock delay in seconds, and MMS is a main memory size. In some aspects, the TURP indicates a threshold time period that the table has not been accessed for the cost function to consider the table as unused.

In some implementations, the cost function 200 considers each of these parameters to determine whether a given table should be unloaded. As shown in FIG. 2, the cost function 200 first checks to see if TPL=0, which indicates that the table is not part of the preload tables, such as tables required at start up. In some aspects, if the table is part of the preload tables, the cost function 200 would not unload the table. The cost function 200 may then check to see if TUP>0, which indicates that the table's unload priority is at least not zero ("DontUnloadAtALL"). In some implementations, if the TUP=0, it would mean that the table has been set to not unload, such as the setting "DontUnloadAtAll."

The cost function 200 may then compare different parameters to determine if all conditions have been met to unload a given table. In the example of FIG. 2, the cost function 200 checks if TURP>0, which indicates that the threshold period of non-use (i.e., unused retention period) has been set to a non-zero value. The cost function 200 also checks if TLD>TURP, which indicates that the table lock delay (i.e. time since the last table lock) is greater that the threshold time period to consider the table unused (i.e. TURP). The cost function 200 also checks if TLD>1200, which indicates whether the table lock delay is greater than 20 minutes. The cost function 200 also checks if TLD>MMS, which indicates that the table lock delay is greater than the main memory size in MB. In some aspects, the cost function may alternatively, or additionally, check if TLD/MMS>X, where X is a threshold. The threshold X may be user-defined or system-defined. If all the conditions of the cost function 200 are true, the computing system 110 may unload the table.

The table size may also be considered as part of the unload decision. For example, a table may be unloaded if the processing cost for a reload does not exceed a threshold, such as TLD >MMS. In order for a table not to be constantly unloaded and reloaded, ping-pong effect, the cost function 200 and/or the computing system 110 may consider the last table load time (TLT) when deciding to unload. In some aspects, the cost function 200 and/or the computing system 110 may count the number of automatic table unloads (ATUs) to help determine whether to unload a table in the future. For example, if the number of unloads for one table increases in comparison to other tables, then the cost function 200 and/or the computing system 110 may determine that this table should not be unloaded.

It may be beneficial to receive feedback regarding past unloading decisions, such as unloading decisions of the cost function 200, to determine whether the unloading decision was correct and/or effective. The load and unload times per table may be used to train a machine learning system. The machine learning systems may analyze one or more inputs to calculate an unload decision for a table and to evaluate past unload decisions. The one or more inputs may include a last time locked timestamp, such as the TLD, the table unload priority such as the TUP, the table preload setting such as the TPL, a first time threshold such as the table's unused retention period, TURP, a second time threshold such as a user defined threshold (e.g., 20 minutes), and a ratio threshold associated with a table lock delay and a table size such as TLD/MMS>X or TLD>MMS. In some aspects, the machine learning system may comprise the computing system 110. A machine learning model of the machine learning system may evaluate the impact of past unloading decisions as a decision-making tool. In some aspects, the model assumes that the future use of the table is not significantly different from the old one. If so, then the algorithm may make more accurate unloading decisions. If the usage changes significantly, the further training may allow the algorithm to adapt to the changed usage.

The machine learning system may comprise a neural network. The machine learning system may be trained in an unsupervised or supervised manner. In some implementations, for all considered tables, the history of different aspects of table usage, loading, unloaded and/or the like may be recorded. This history may include the load status of the table, the increase difference of the read-lock counter and the automatic unload decisions. The respective values may be retrieved periodically by a system process, such as mergedog, and recorded in the history on a rolling basis. From the load status history of the table, loads and unloads of each table may be retrieved. The machine learning system may be trained to distinguish between table usage for business purposes and table usage for housekeeping purposes. If the machine learning system indicates that a table is only used by housekeeping processes it may factor that parameter in its decision to unload the table. As such tables are unloaded less housekeeping processes run and thus over all the system resources may beneficially be dedicated to business purpose processes than for housekeeping processes.

The machine learning system may group the loaded tables. The grouping may serve to limit the machine learning processing/training. The larger the set of tables the more complex the algorithm to be trained and the higher the expected efficiency. On the other hand, the complexity of the algorithm may increase the learning processing/training. For each group of tables, the machine learning system may apply an algorithm or model. The described history of the tables of a group may form the input of the algorithm. The output of the algorithm may be an unload decision for each table and/or table group.

Training the unload decision algorithm may involve using the different historical aspects of the tables. A decision to unload a table is compared with the time until the table is reloaded again, such as to answer some query request. If that time is long, then that may indicate the decision was right. If the time to reload was short, then it may indicate that the decision was wrong. If the table was not unloaded despite the fact that it was not used afterwards, then the machine learning system may determine that a decision not to unload was likely incorrect. In some aspects, it may be advantageous to reload a table(s) shortly before the first subsequent use after a meaningful unload. Reloading may shorten the query execution time of this first subsequence use by reducing the amount of data in the tables and the load time of the table. For reloading a table, the output level of the algorithm may include a load decision in addition to the unload decision.

The training of the algorithm may be based on a portion of past unload decision for a given time period. For example, the algorithm may check a portion of past data, such as the 90% of the older part of the historic data, to find unload decisions. The algorithm, with the remainder, more recent portion (such as the 10% most recent data), may determine the past unload and/or reload decisions were correct or incorrect. The algorithm may then be updated based on the determinations of past decisions.

FIG. 3 depicts a timeline diagram 300 of read accesses of a table during a time period, in accordance with some implementations. As shown in FIG. 3, time "tU" 301 represents the time when the table was unloaded. Time "tL" 310 represents the time when the table was reloaded due to some data access which may require the table to be loaded. Times 302, 304, and 306 indicate points in time when the read accesses occurred and indicate the number of read accesses that occurred during the respective point in time. As shown in FIG. 3, at time 302, one read access occurred, at time 304, two read accesses occurred, and at time 306, one read access occurred. The read accesses that occur during the time when the table is unloaded may be to access the table's metadata. For such read accesses to the metadata, the table may not need to be loaded.

The machine learning analysis of tables may be done on individual tables, groups of tables, all tables together, and/or a combination of the above. FIG. 3, further depicts an equation 350 for summing the product of a table's size and a time between the table's unload and reload. As shown, in FIG. 3, "N" represents the total number of tables. "TS" represents the table memory size/usage and "S" represents a threshold. As unload decisions are evaluated, the machine learning model and/or the cost function 200 may be updated based on the feedback received. In some aspects, if the value for $TS*exp(tU-tL)$ for a given table is below the threshold S, the machine learning system may determine that unloading would not make sense and would not unload the table. As such, a positive unload decision may then be considered incorrect whereas a negative decision, such as keeping the table loaded, would be considered correct. In some implementations, if the value for $TS*exp(tU-tL)$ for a given table is above the threshold S, the machine learning system may determine that unloading would be appropriate and would unload the table. In this implementation, a positive unload decision may be considered correct, while a negative decision would be considered incorrect. This algorithm may also be used to determine whether to reload unloaded tables in advance.

In some aspects, the computing system 110 may implement a combination of the cost function 200 and the machine learning algorithm described herein. For example, the computing system 110 may implement the cost function 200 to determine whether to unload a table. Additionally, the recorded individual read/write locking history and the load status history of all tables may be inputted into a machine learning algorithm and/or a neural network. The output of the algorithm and/or neural network layer may include a load decision per table, this is interpreted as both unloading or deciding to keep the table loaded or to load an unloaded table or keep it where it is. The output unload decision of the cost function 200 may be compared to the output of the machine learning algorithm and a final unload decision may be determined based on the comparison. In other aspects, the cost function 200 may be treated as an input to machine learning algorithm for the machine learning algorithm to base its unload decision on.

Figure 4:
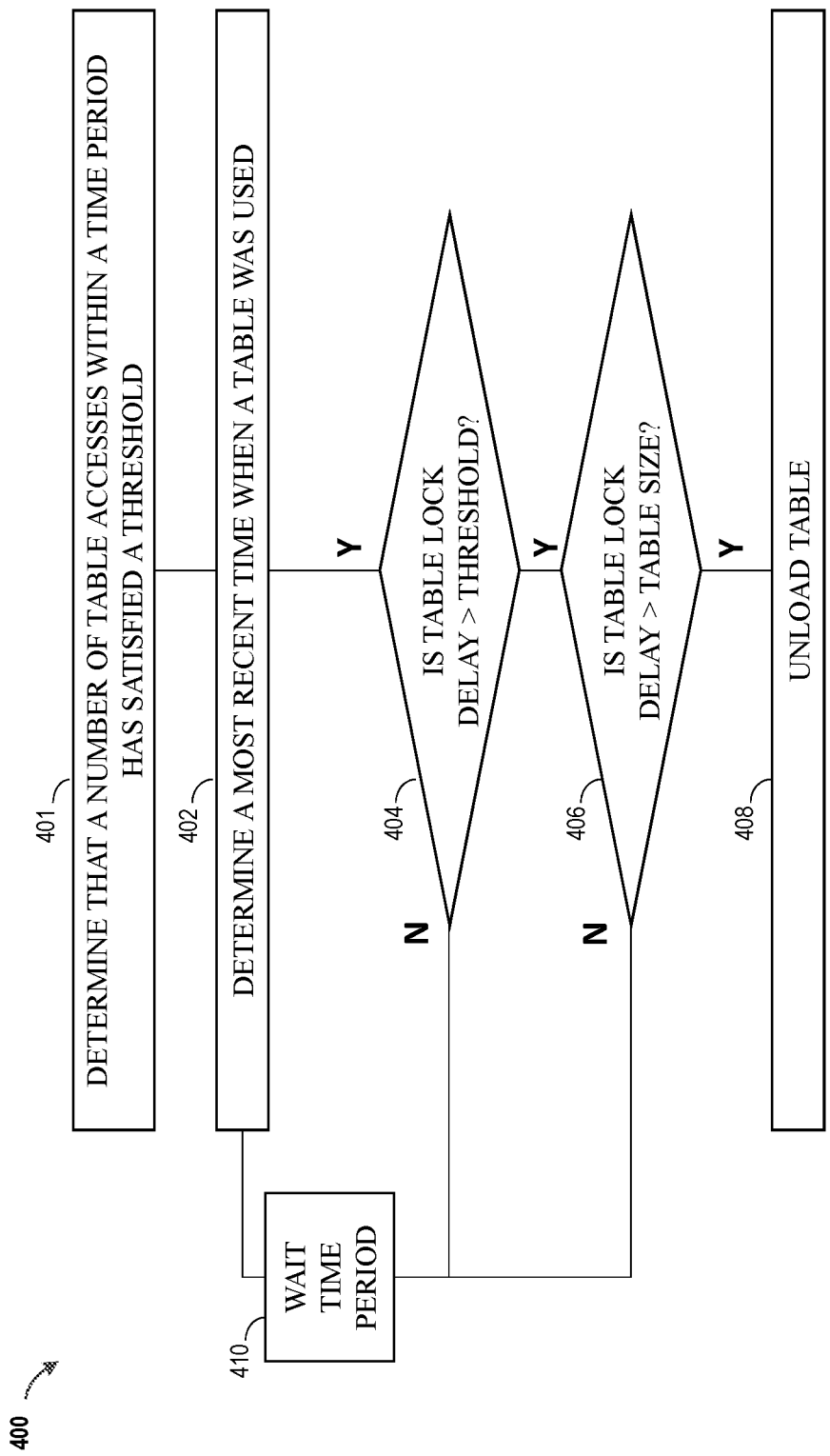
FIG. 4 depicts a flowchart illustrating a process for unloading a table in a database management system.
Figure 5:
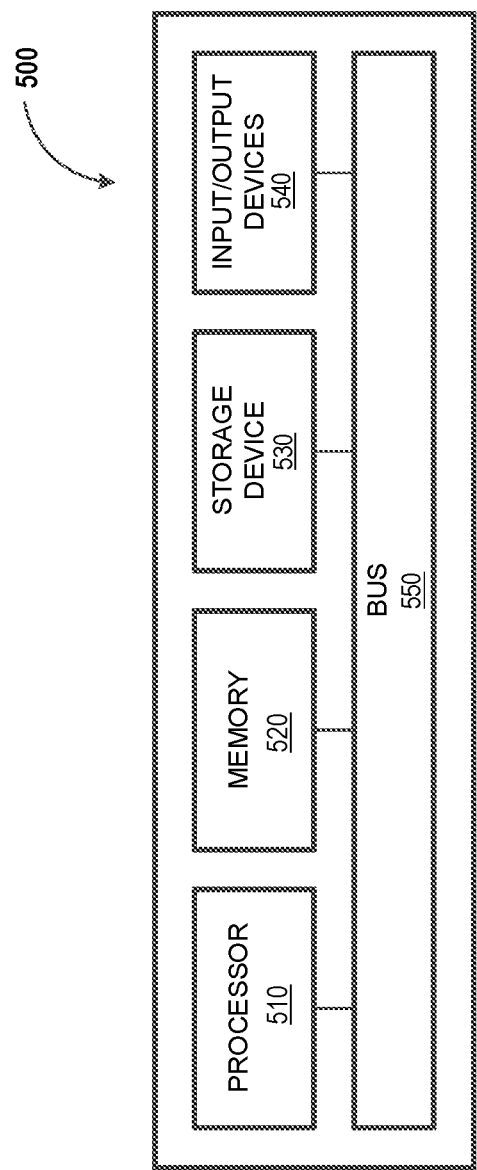
FIG. 5 depicts a block diagram illustrating a computing apparatus, in accordance with some example implementations.

FIG. 4 depicts a flowchart illustrating a process 400 for unloading a table, in accordance with some example implementations. Referring to FIGS. 1 and 5, the process 400 may be performed by a computing apparatus such as, for example, the computing system 110, the user access device 140 and/or the access device 165, and/or the computing apparatus 500.

At operational block 401, the apparatus 500, for example, may determine that a number of table accesses, such as a table lock and/or an acquired index handle, occurring within a time period has satisfied a threshold. The threshold may indicate that the table access is a full business-related table access rather than a general housekeeping table access. At operational block 402, the apparatus 500, for example, may determine a most recent time when a loaded table was last used. In some aspects, the time is determined based on when an index handle of a table was last acquired. At operational block 404, the apparatus 500, for example, may determine whether a table lock delay (TLD) parameter satisfies a time threshold. In some aspects, the TLD parameter indicates a time since the table was last locked and is based on the determined most recent time when the table was used. If the threshold is satisfied, the process 400 proceeds to operational block 406. At operational block 406, the apparatus 500, for example, may determine whether the TLD parameter is greater than a table size. In some aspects, the determination may be based on whether TLD/MMS>X, where X is a threshold ratio and MMS is the table size. At operational block 408, the apparatus 400, for example, may unload the table. If any of the operational blocks 404 and 406 are no, then the process 400 proceeds to operational block 410 where the apparatus 500 may wait for a certain time period before starting the process over by returning to operational block 402.

FIG. 5 depicts a block diagram illustrating a computing apparatus 500 consistent with implementations of the current subject matter. Referring to FIGS. 1-3, at least a portion of the computing apparatus 500 may be used to implement at least a portion of the computing system 110, an apparatus providing the database 120, an apparatus providing the external software 130, one or more of the user access devices 140, an access device 165, the process 600 and/or the like.

As shown in FIG. 5, the computing apparatus 500 may include a processor 510, a memory 520, a storage device 530, and input/output devices 540. The processor 510, the memory 520, the storage device 530, and the input/output devices 540 may be interconnected via a system bus 550. The processor 510 is capable of processing instructions for execution that may implement operations consistent with those described herein. Such executed instructions may be implement by one or more components of, for example, the computing system 110, the user access device 140 and/or the access device 165. In some example implementations, the processor 510 may be a single-threaded processor. Alternately, the processor 510 may be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing apparatus 500. The memory 520 may store data structures representing configuration object databases, for example. The storage device 530 is capable of providing persistent storage for the computing apparatus 500. The storage device 530 may be a floppy disk device, a hard disk device, an optical disk device, or a tape device, or other suitable persistent storage means. The input/output device 540 provides input/output operations for the computing apparatus 500. In some example implementations, the input/output device 540 includes a keyboard and/or pointing device. In various implementations, the input/output device 540 includes a display unit for displaying graphical user interfaces. In some aspects, a visual display of one or more table aspects may be based on table size, table usage/lock history, for read and/or write functions, and table load status history. In some aspects, for each pass/period/ run of a decision process described herein, one pixel may be reserved for each individual table. The color value of the pixel may be made up of the following table properties: 2 bits for actual read locking; 1 bit for write locking; 1 bit for the load status (loaded, unloaded); and some bits for the table size.

According to some example implementations, the input/output device 540 may provide input/output operations for a network device. For example, the input/output device 540 may include Ethernet ports or other networking ports to communicate with one or more wired and/or wireless networks (e.g., a local area network (LAN), a wide area network (WAN), the Internet). The input/output device 540 may include one or more antennas for communication over the network 160 with the computing system 110, the user access device 140 and/or the access device 165. Wireless networks may include Wi-Fi, WiMAX, and cellular networks (2G/3G/4G/5G), and/or any other wireless network.

In some example implementations, the computing apparatus 500 may be used to execute various interactive computer software applications that may be used for organization, analysis and/or storage of data in various formats. Alternatively, the computing apparatus 500 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities or may be standalone computing products and/or functionalities. Upon activation within the applications, the functionalities may be used to generate the user interface provided via the input/output device 540. The user interface may be generated and presented to a user by the computing apparatus 500 (e.g., on a computer screen monitor, etc.).

Figure 6:
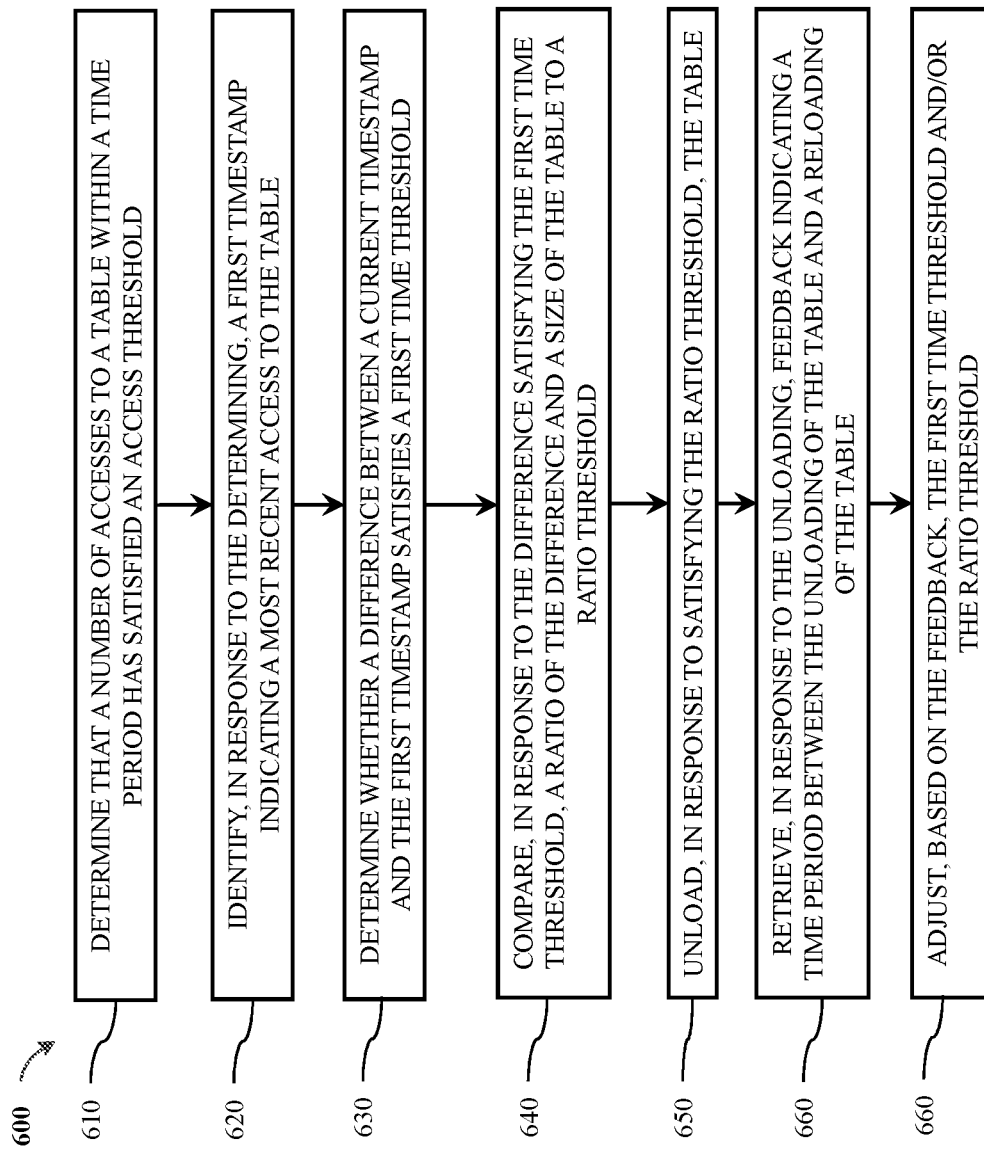
FIG. 6 depicts a flowchart illustrating a process for unloading tables in a database management system, in accordance with some example implementations.

FIG. 6 depicts a flowchart illustrating a process 600 for unloading tables in a database management system, in accordance with some example implementations. Referring to FIGS. 1-5, the process 600 may be performed by a computing apparatus such as, for example, the computing system 110, the user access device 140 and/or the access device 165, and/or the computing apparatus 500.

At operational block 610, the apparatus 500, for example, may determine that a number of accesses to a table within a time period has satisfied an access threshold. At operational block 620, the apparatus 500, for example, may identify, in response to the determining, a first timestamp indicating a most recent access to the table. At operational block 630, the apparatus 500, for example, may determine whether a difference between a current timestamp and the first timestamp satisfies a first time threshold. At operational block 640, the apparatus 500, for example, may compare, in response to the difference satisfying the first time threshold, a ratio of the difference and a size of the table to a ratio threshold. At operational block 650, the apparatus 500, for example, may unload, in response to satisfying the ratio threshold, the table. At operational block 660, the apparatus 500, for example, may retrieve, in response to the unloading, feedback indicating a time period between the unloading of the table and a reloading of the table. At operational block 670, the apparatus 500, for example, may adjust, based on the feedback, the first time threshold and/or the ratio threshold.

One or more aspects or features of the subject matter described herein may be realized in digital electronic circuitry, integrated circuitry, specially designed ASICs, field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example, as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   determining that a number of accesses to a table occurring within a first time period has satisfied an access threshold;
   identifying, in response to the determining, a first timestamp indicating a most recent access to the table;
   determining whether a difference between a current timestamp and the first timestamp satisfies a first time threshold;
   comparing, in response to the difference satisfying the first time threshold, a ratio of the difference and a size of the table to a ratio threshold;
   unloading, in response to satisfying the ratio threshold, the table;
   retrieving, in response to the unloading, feedback indicating a second time period between the unloading of the table and a reloading of the table; and
   adjusting, based on the feedback, the first time threshold and/or the ratio threshold.

2. The system of claim 1, wherein the retrieving the feedback comprises:
   calculating a second difference between a second timestamp associated with the unloading and a third timestamp associated with the reloading;
   comparing the second difference to a second time threshold; and
   determining, based on the comparing, whether the unloading was correct, wherein the feedback comprises the determination of whether the unloading was correct.

3. The system of claim 2, wherein the determining whether the unloading was correct comprises:
   determining, in response to the second difference being greater than the second time threshold, that the unloading was correct; and
   determining, in response to the second difference being less than the second time threshold, that the unloading was incorrect.

4. The system of claim 1, wherein the operations further comprise:
   training a machine learning model to calculate an unload decision for the table, wherein the a first timestamp, the current timestamp, the first time threshold, the ratio threshold, and the feedback are inputs to the machine learning model, wherein the unloading is based on the trained machine learning model unload decision.

5. The system of claim 1, wherein the unloading is based on a table unload priority and a table preload setting.

6. The system of claim 5, wherein the table unload priority is a non-zero value, wherein the table preload setting is a zero value.

7. The system of claim 5, wherein the table unload priority indicates a priority for unloading the table, and wherein the table preload setting indicates whether the table is a preloaded table.

8. The system of claim 5, wherein the operations further comprise:
   determining a type of table access for each of the number of accesses to the table, wherein the type of table access comprises a first type of access associated with a first table unload priority and a second type of access associated with a second table unload priority, wherein the first table unload priority is higher than the second table unload priority.

9. The system of claim 5, wherein the first time threshold is a table unused retention period, the table unused retention period indicating the table is unused, wherein the operations further comprise:
   comparing the difference to a second time threshold, the second time threshold a user-defined value and different than the first time threshold, wherein comparing the ratio of the difference and the size of the table to the ratio threshold is in response to the difference satisfying the second time threshold.

10. The system of claim 1, wherein the operations further comprise:
    calculating, in response to the unloading, an expected time when the table will be accessed; and
    reloading, prior to the expected time, the table.

11. A method comprising:
    determining, by at least one processor, that a number of accesses to a table occurring within a time period has satisfied an access threshold;
    identifying, by the at least one processor and in response to the determining, a first timestamp indicating a most recent access to the table;

determining, by the at least one processor, whether a difference between a current timestamp and the first timestamp satisfies a first time threshold;

comparing, by the at least one processor and in response to the difference satisfying the first time threshold, a ratio of the difference and a size of the table to a ratio threshold;

unloading, by the at least one processor and in response to satisfying the ratio threshold, the table;

retrieving, by the at least one processor and in response to the unloading, feedback indicating a time period between the unloading of the table and a reloading of the table; and adjusting, by the at least one processor and based on the feedback, the first time threshold and/or the ratio threshold.

12. The method of claim 11, wherein identifying the first timestamp is based on a table lock.

13. The method of claim 11, further comprising:

calculating, by the at least one processor, a second difference between a second timestamp associated with the unloading and a third timestamp associated with the reloading;

comparing, by the at least one processor, the second difference to a second time threshold; and determining, by the at least one processor and based on the comparing, whether the unloading was correct, wherein the feedback comprises the determination of whether the unloading was correct.

14. The method of claim 13, wherein the determining whether the unloading was correct comprises:

determining, in response to the second difference being greater than the second time threshold, that the unloading was correct; and determining, in response to the second difference being less than the second time threshold, that the unloading was incorrect.

15. The method of claim 11, wherein the unloading is based on a table unload priority and a table preload setting.

16. The method of claim 15, wherein the table unload priority indicates a priority for unloading the table, and wherein the table preload setting indicates whether the table is a preloaded table.

17. The method of claim 15, further comprising:

determining a type of table access for each of the number of accesses to the table, wherein the type of table access comprises a first type of access associated with a first table unload priority and a second type of access associated with a second table unload priority, wherein the first table unload priority is higher than the second table unload priority.

18. The method of claim 11, further comprising:

calculating, in response to the unloading, an expected time when the table will be accessed; and reloading, prior to the expected time, the table.

19. The method of claim 18, wherein the reloading is based on the size of the table.

20. A non-transitory computer readable medium storing instructions which, when executed by at least one processor, cause operations comprising:

determining that a number of accesses to a table occurring within a time period has satisfied an access threshold;

identifying, in response to the determining, a first timestamp indicating a most recent access to the table;

determining whether a difference between a current timestamp and the first timestamp satisfies a first time threshold;

comparing, in response to the difference satisfying the first time threshold, a ratio of the difference and a size of the table to a ratio threshold;

unloading, in response to satisfying the ratio threshold, the table;

retrieving, in response to the unloading, feedback indicating a time period between the unloading of the table and a reloading of the table; and adjusting, based on the feedback, the first time threshold and/or the ratio threshold.

* * * * *